Dec. 17, 1968    R. D. BUCK    3,416,638
CORROSION RESISTANT CARRIER ROLLER FOR BELT CONVEYORS
Filed Dec. 8, 1967    2 Sheets-Sheet 1
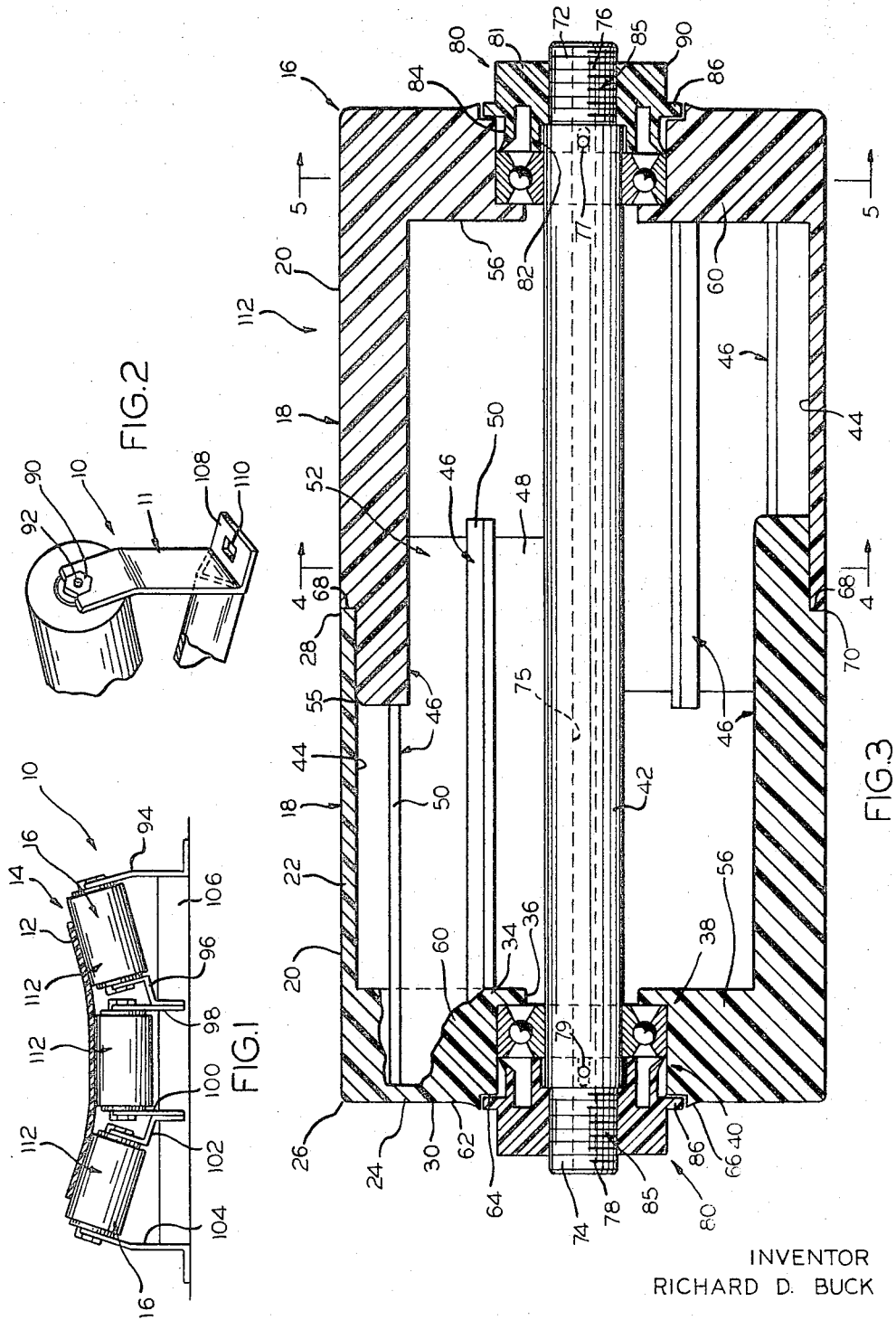
INVENTOR
RICHARD D. BUCK
BY
Mann, Brown McWilliams
ATTORNEYS

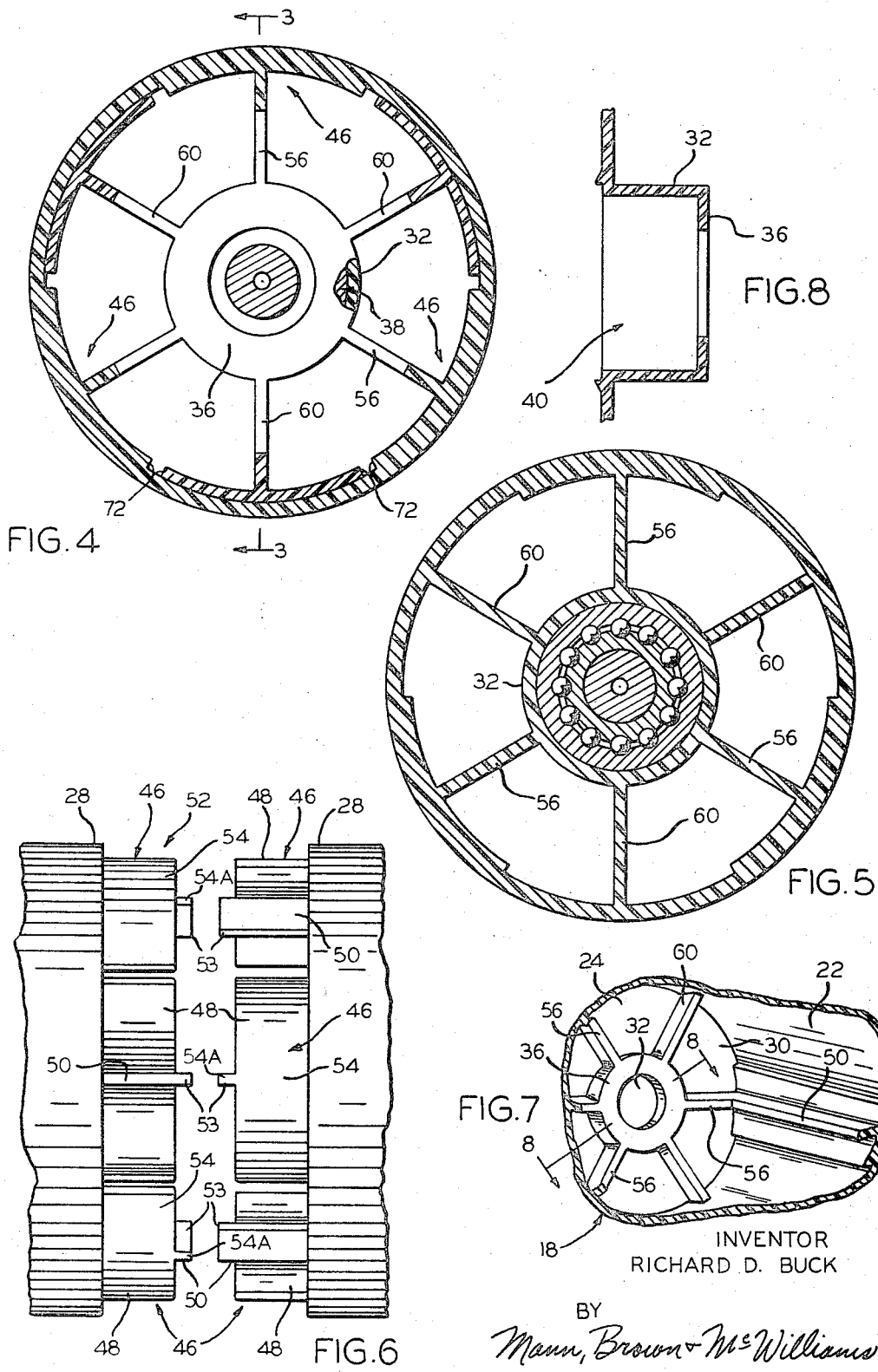

United States Patent Office 3,416,638
Patented Dec. 17, 1968

3,416,638
CORROSION RESISTANT CARRIER ROLLER FOR BELT CONVEYORS
Richard D. Buck, 645 Seneca Drive, Aurora, Ill. 60506
Filed Dec. 8, 1967, Ser. No. 689,080
9 Claims. (Cl. 193—37)

ABSTRACT OF THE DISCLOSURE

The invention relates to a conveyor belt carrier roller formed from a corrosion resistant plastic and in the form of two identical sections that are joined together by solvent bonding. The sections are each in the form of an annular wall having one end closed by a web defining a sleeve forming a bearing unit receiving socket, with the sections each including a plurality of ribs extending axially thereof and comprising radially and circumferentially extending portions that project outwardly of the respective section open ends for insertion in the other section, with the bonding solvent being applied to the open ends of the sections and the overlapping rib portions. The radial rib portions extend the length of the respective sections and are joined to the respective section sleeves. Ball bearing units are press fitted into the sockets of the respective ends and are received over a mounting shaft which is in turn seated on a carrier frame.

---

This invention relates to a corrosion resistant carrier roll or roller for belt conveyors, and more particularly, to a special belt conveyor supporting roller construction that has particular application in such fields as the chemical and food industries, where the belt supporting roller is subject to corrosion due to moisture, chemicals and other sources.

The upper run of belt conveyors is conventionally supported between its end pulleys by a plurality of what are known as carriers. A carrier comprises a frame extending transversely of the belt that journals several rollers, usually three, in end-to-end relation, with the outer rollers disposed at an upwardly inclined angle with respect to the horizontal to give the belt upper run a trough shape that helps keep the load centered on the belt.

Heretofore it has been the practice to make the rolls for the carrier from steel or other suitable ferrous based materials because of the long wearing qualities generally attributed to such materials. However, experience has shown that in applications where, under the environmental conditions involved, the rollers are overly exposed to conditions of moisture, heat, and corrosive substances, even steel rollers fail within a short period, necessitating frequent shut downs for rollers replacement.

The principal object of this invention is to provide a carrier roll arrangement that overcomes the corrosion problem, while providing adequate load supporting capacity for the usual industrial applications for equipment of this type.

Another principal object of the invention is to provide a light weight corrosion resistant roller that is adapted for application to existing carrier frame arrangements, to replace, if desired, standard steel rollers.

Other objects of the invention are to provide a plastic roller that is especially arranged for ease of manufacture and assembly, to provide a plastic roller made up of two identical halves that may be rapidly formed by employing conventional injection molding processes or the like and provide for ready assembly of the halves as they come out of the machine to form individual rollers that require no further machining, and to provide a belt conveyor carrier and roller arrangement therefor that are economical of manufacture, convenient to install and use, and long lived under problem conditions in the industry.

Other objects, uses and advantages will be obvious or become apparent from a consideration of the following detailed description and the application drawings.

In the drawings:

FIGURE 1 is a small scale side elevational view of a carrier frame and roller therefor in accordance with this invention, which is taken transversely of the usual path of movement of the conveyor belt;

FIGURE 2 is a fragmental perspective view showing one end of the carrier frame and adjacent roller thereof that is shown in FIGURE 1;

FIGURE 3 is an enlarged cross-sectional view taken longitudinally of one of the rollers of FIGURE 1, and along line 3—3 of FIGURE 4, illustrating the specifics of the roller, and showing one of its reinforcing ribs broken away at the end of the roller;

FIGURE 4 is a diagrammatic cross-sectional view taken substantially along line 4—4 of FIGURE 3;

FIGURE 5 is similar to that of FIGURE 4 but taken along line 5—5 of FIGURE 3;

FIGURE 6 is a fragmental side elevational view of the two roller forming sections showing them as they are to be applied to each other in the course of assembling a completed roller;

FIGURE 7 is a fragmental small scale perspective view of the interior of one of the roller forming sections at one end thereof, illustrating the arrangement of the roller reinforcing ribbing; and FIGURE 8 is a fragmental cross-sectional view along line 8—8 of FIGURE 7.

However, it is to be understood that the specific drawing illustrations provided are supplied primarily to comply with the requirements of the patent code, and that the invention may have other embodiments that are intended to be covered by the appended claims.

Reference numeral 10 of FIGURES 1 and 2 generally indicates a carrier for the upper run 12 of a belt conveyor 14, which carrier 10 is provided with the novel rolls 16 arranged in accordance with this invention mounted on the frame 11 thereof.

Referring to FIGURES 3 and 6, each roll 16 is made up of a pair of identical half rolls 18 formed from a corrosion resistant plastic, and a preferred material that is well suited for purposes of this invention is acrylonitrile-butadiene-styrene composition sold by Fiberfil, Inc. of Evansville, Indiana under the trademark ABSAFIL. The G–1200/40 grade of this material is preferred, which includes a fiberglass filler of 40% in which the fibers are relative long (on the order of $7/16$ of an inch).

Each roller half 18 comprises a one-piece element defining a cylindrical body 20 having an annular side wall 22 and a web 24 formed across one end 26 of the body, with the other end 28 being open in the unassembled state.

The web 24 forms the side wall 30 of the roller and is formed to define an annular sleeve 32 extending inwardly of the wall 30 toward the roller section end 28, which sleeve 32 is concentrically located with respect to the longitudinal axis of the individual roller sections. The sleeve 32 at its inner end 34 includes a radially extending flange 36, against which is seated, in the assembled condition of the roller, a rolling bearing in the form of ball bearing unit 38 that is preferably press fitted into place. The sleeve 36 of each section 18 defines a socket 40 for receiving the ball bearing unit 38 that is mounted on shaft 42 which extends through the completed roller, and thus between the assembled roller sections 18, in the manner suggested in FIGURE 3 (in the assembled relation of the roller).

The ribs 46 each include a circumferentially extending portion 48 and a radially extending portion 50, as indicated in FIGURES 3, 6 and 7; the ribs extend from the roller section end walls 30 to the open ends 28 of the section and project from such open ends 28 to provide outwardly projecting rib segments 52 (see FIGURE 6). The circumferentially extending portions 48 of ribs 46 at segments 52 are formed to define outwardly facing surfaces 54 which substantially complement the diameter of roller section internal surface 44.

As indicated in FIGURE 7, the rib radial portions 50 of the respective ribs 46 also extend to the roller section end wall 30 and are joined to the sleeve 32 by integrally united extensions 56. At the roller section open ends 28, the rib portions 50 project axially somewhat beyond the portions 48 for strengthening purposes, as indicated at 53, which extensions further extend the rib surfaces 54 as at 54a (see FIGURE 5). At the ends of projections 53 the radially outward corners are rounded inwardly, as at 55.

As indicated in FIGURES 4 and 5, the ribs 46 are spaced equidistant about the circumference of the respective roller sections 18 and in the specific roller arrangement illustrated, they are three in number for each section. At the roller end wall 30, and located intermediate the respective ribs 46, are supplemental reinforcing radial ribs 60 that extend between the roller section annular wall 22 and its sleeve 32.

Further, in accordance with this invention, the roller section end wall 30 on its external surface 62 is formed with an annular sealing surface 64 that is encircled by a flared lip or shoulder 66 which cooperates with the special seal disclosed in my copending application Ser. No. 689,053 that was filed concurrently herewith (the disclosure of which is hereby incorporated herein in its entirety by this reference).

As already indicated, the roll sections 18 are identical and in accordance with this invention, any two of the roll sections 18 may be assembled to form a complete roll 16. This is done by applying along the terminal portion 68 of the roller section end 28, and along the surfaces 54 of ribs 46, a suitable bonding solvent, such as methyl ethyl ketone, and then inserting the projecting rib segments 52 of the respective roll sections into and within the annular wall 22 of the respective sections to the point that the terminal edges 68 of the respective sections are in contact. The bonding solvent indicated effects a temporary dissolving of the plastic material of the respective surfaces indicated so that the material of the respective adjacent parts joins together to integrally unite the roller sections, with the rib projections 52 of one section then bearing in reinforcing relation to the annular wall of the other roller section and vice versa. The entire bonding action takes less than a minute and the result is a completed roll that requires no further machining.

As indicated in FIGURE 4, the circumferential rib portions 48 are of substantial dimension circumferentially of the roller sections, and are proportioned so that along the joint line 70 of the roller (see FIGURE 3) the side edges 72 are in closely spaced relation. A spacing on the order of ⅛ of an inch is preferred. Radial rib extensions 53 further the reinforcing action of rib portions 50 beyond the ends of rib portions 48, and their rounded corners 55 provide a self centering function when the sections 18 that are to make up a roller 16 are assembled as described above.

It will thus be seen that the roller of this invention adapts itself for mass production procedures. One way that roller 16 could be made is by applying a suitable injection molding procedure to individually form the respective roller sections, then as the respective roller sections are removed from the machine, and arranged in pairs, the individual sections can be maneuvered to dip the ends 28 into a container of the bonding solvent up to a predetermined level (which should cover the rib segments 52 and roll section surfaces 68), after which the two so treated sections may be joined together by pressing the ribs 46 of the respective sections into each other in the manner indicated, manually or otherwise. I contemplate that a single operator and injection molding machine may readily perform the entire procedure, and since no machining of the roller is required, this will provide a completed roller ready for application of the ball bearing units 38 to sockets 40.

The ball bearing unit 38 may be of any suitable type and that illustrated is intended to represent any conventional and suitable type of bearing unit, whether of the ball type or otherwise, although for the illustrated application of rollers 16 an antifriction roller or ball bearing unit employing inner and outer races (as illustrated) is preferred. Unit 38 is shown as including an outer race 71, an inner race 73 and a plurality of bearing balls 75 interposed therebetween and held in spaced relation by the usual spacing device (not shown). Unit 38 preferably is of the "sealed-for-life" type where dust and corrosion will be a problem in any given installation. Units 38 are preferably applied to the individual rollers 16 in the assembled condition or both, with the bearing units being press fitted into the positions indicated by applying pressure to the outer race of each unit with a suitable press fitting apparatus.

Individual rollers 16 with the bearing units 38 applied thereto are each supplied with a shaft 42 that in the form illustrated is of the dead shaft application type. Shaft 42 is formed at either end 72 and 74 thereof with threaded end portions 76 and 78, respectively, with the shaft 42 being inserted through the inner races of the ball bearing units. The shaft 42 should be proportioned so that the ends 72 and 74 extend somewhat outwardly of the roller end walls 30 in the manner indicated for application thereto of the novel seal 80 that is specifically described in my said copending application. Reference may be had to my said copending application for details of the seal 80, but it is here pointed out that the seal 80 is a one-piece member that is preferably formed from a suitable lubric plastic material such as Delrin (an acetal resin product made by DuPont) or nylon that is provided in the form of a body 81 defining the spaced annular flanges 82 and 84 that respectively bear against the ball bearing unit races in the manner described in my said application.

The seal body 81 is internally threaded as at 85 to be turned up against the respective ball bearing units and includes a radial flange portion 86 that is disposed in closely spaced relation to the roller end wall surfaces 64 when the flange 82 of the seal engages the bearing unit inner race.

The body 81 is shaped to define a lug portion 90 exteriorly of flange 86 that in the form illustrated is hex-shaped and proportioned so as to be adapted to seat in the hex-shaped opening 92 of the conventional carrier frame 11 on which the rollers 16 are mounted. Lug portion 90 in practice may be shaped and proportioned to fit into or be otherwise supported by any suitable carrier frame.

As indicated in FIGURES 1 and 2, the carrier frame 11 is shown in the form of a plurality of support arms 94, 96, 98, 100, 102 and 104 affixed to a suitable bracing member 106 that is shown in the form of an angle iron, with the carrier frame components being joined together in any suitable manner, as by welding. The end support members 94 and 104 are formed with feet 108 formed to define suitable bolt holes 110 for purposes of mounting the carrier frame in place in the usual manner.

The individual rollers 16 with the bearing units 38, shaft 42, and seals 80 applied thereto in the manner indicated in FIGURE 3 form roller assemblies 112 and may be applied to any one of the three roller positions shown in FIGURE 1 and interchanged as desired as all the carrier frame support arms are formed with the identical hex-shaped mounting seats 92. The seal flanges 86 serve to properly center the rollers between the respective pairs of roller support arms indicated in FIGURE 1.

The plastic material that is preferred to make the roller sections 18 in accordance with this invention is not only resistant to corrosion, but also may be made in any desired color thereby avoiding the need to paint the roller and at the same time permit the introduction of aesthetics in the form of suitable coloring in belt conveyor equipment. This is particularly desirable in the food handling field where white rollers are desired.

The indicated preferred plastic material is of the high impact type and rollers made in accordance with this application and employing bearing units rated at 125 lbs. at each end of the roller have successfully withstood 500 hour test runs under the usual test conditions.

It will therefore be seen that I have not only provided a corrosion resistant roller for belt conveyors that is especially adapted for the troublesome applications in the food processing and chemical industries, but also the roller lends itself to manufacture using comparatively inexpensive materials and manufacturing techniques. The special ribbing structure of the roller sections forms a firm reinforcement that extends lengthwise of the roller and insures good performance within rated load conditions. Furthermore, the roller unit disclosed is readily adapted for either new installations or replacement of roller in existing belt conveyor units.

The foregoing description and the drawings are given merely to explain and illustrate my invention, and the invention is not to be limited thereto, except insofar as the appended claims are so limited, since those skilled in the art who have my disclosure before them will be able to make modifications and variations therein without departing from the scope of the invention.

The embodiment of the invention in which exclusive property or privilege is claimed are defined as follows.

1. A plastic roller for belt conveyor carriers and the like, said roller comprising:
   a pair of substantially identical sections,
   each of said sections being formed from a corrosion resistant plastic material and defining a generally cylindrical one-piece hollow body in the form of an annular sidewall having a web formed across one end thereof and the other end open,
   said web of the respective bodies forming an end wall of the roller and being formed to define an annular sleeve portion extending inwardly and axially of the respective bodies,
   each of said bodies being formed on the interior thereof with a plurality of ribs in spaced apart relation circumferentially of the respective bodies,
   each of said ribs comprising a portion disposed radially of the respective bodies and a portion disposed circumferentially thereof,
   said ribs projecting outwardly of the respective bodies at said open end thereof and axially of the respective bodies to define outwardly projecting segments,
   said radially disposed portions of said ribs of the respective bodies extending to and being integrally connected with the respective body sleeve portions along the lengths of the latter,
   said sections being secured together at said open ends of said bodies with said rib projecting segments of the respective bodies projecting into and being bonded to the other body in overlapping relation to same.

2. The plastic roller set forth in claim 1 wherein:
   said circumferential portions of said ribs at said outwardly projecting segments have outer diameters that substantially complement the inner diameters of the respective bodies,
   and wherein said circumferential rib portions at the juncture of said sections are disposed in closely spaced relation and in summation circumferentially overlap the major proportion of the body side walls.

3. The plastic roller set forth in claim 2 wherein:
   said ribs of each body are three in number and are substantially equally spaced circumferentially of the respective bodies,
   said circumferential rib portions at the juncture of said sections being spaced apart a distance circumferentially of said roller on the order of 1/8 inch.

4. The plastic roller set forth in claim 3 wherein:
   each of said bodies includes a radially disposed flange portion extending between said sleeve and said sidewall thereof midway between the respective radially disposed rib portions.

5. The plastic roller set forth in claim 1 wherein:
   said plastic material is an acrylonitrile-butadiene-styrene composition containing a fiberglass filler of long fiber length.

6. The plastic roller set forth in claim 5 wherein:
   said sections are bonded to each other at said open ends and at said rib projecting segments by a solvent bond.

7. The plastic roller set forth in claim 2 wherein:
   said radially disposed rib portions at said rib segments project beyond said respective circumferential rib portions and at said extensions have surface portions struck on an arc having a diameter that substantially complements the inner diameter of the respective bodies.

8. A plastic roller for belt conveyor carriers and the like, said roller comprising:
   a pair of substantially identical sections,
   each of said sections being of one piece construction and being formed from a corrosion resistant plastic material equivalent to acrylonitrile-butadiene-styrene and defining a generally cylindrical one-piece hollow body in the form of an annular sidewall having a web formed across one end and the other end open,
   said web of the respective bodies forming an end wall of the roller and being formed to define an annular sleeve portion inwardly and axially of the respective bodies,
   said sleeve portion defining a socket concentric with the axis thereof for reception of a bearing unit to journal said roller on a shaft,
   each of said bodies being formed on the interior thereof with a plurality of ribs in spaced apart relation circumferentially of the respective bodies,
   each of said ribs comprising a portion disposed radially of the respective bodies and a portion disposed circumferentially thereof,
   said ribs projecting outwardly of the respective bodies at said open end thereof and axially of the respective bodies to define outwardly projecting segments,
   said radially disposed portions of said ribs of the respective bodies extending to and being integrally connected with the respective body sleeve portion along the lengths of the latter.
   said sections being secured together at said open ends of said bodies with said rib projecting segment of the respective bodies projecting into and being bonded by a solvent bond to the other body in overlapping relation to same.

9. A carrier roller for belt conveyors comprising:
   a carrier frame,
   a roller journalled on said frame,
   said roller comprising:
   a pair of substantially identical sections,
   each of said sections being of one piece construction and being formed from a corrosion resistant plastic material equivalent to acrylonitrile-butadiene-styrene and defining a generally cylindrical one-piece hollow body in the form of an annular sidewall having a web formed across one end thereof and the other end open,
   said web of the respective bodies forming an end wall of the roller and being formed to define an annular sleeve portion extending inwardly and axially of the respective bodies, said sleeve portion defining a socket concentric with the axis thereof for reception of a bearing unit to journal said roller, each of said bodies being formed on the interior thereof with a plurality of ribs in spaced apart relation circumferentially of the respective bodies, each of said ribs comprising a portion disposed radially of the respective bodies and a portion disposed circumferentially thereof, said ribs projecting outwardly of the respective bodies at said open end thereof and axially of the respective bodies to define outwardly projecting segments, said radially disposed portions of said ribs of the respective bodies extending to and being integrally connected with the respective body sleeve portions along the lengths of the latter, said sections being secured together at said open ends of said bodies with said rib projecting segments of the respective bodies projecting into and being bonded by a solvent bond to the other body in overlapping relation to same, a bearing unit received in each of said sockets, said units each comprising a rolling bearing device comprising an outer race press filled into the respective sockets, an inner race, a rolling bearing interposed between said inner and outer races, a shaft received within said inner races and having end portions extending exteriorly of said sockets, and seal means received on said shaft end portions and bearing against said rolling bearing devices for sealing same, said frame including upstanding seat means spaced apart to receive said roller, said seal means being formed to non-rotatably seat said shaft in said seat means to mount said roller on said carrier.

References Cited

UNITED STATES PATENTS

| | | | |
|---|---|---|---|
| 2,035,927 | 3/1936 | Smith | 193—37 |
| 2,886,156 | 5/1959 | Halbron | 193—37 |
| 3,217,554 | 11/1965 | Stalker | 29—129.5 X |
| 3,255,858 | 6/1966 | Reilly | 193—37 |

ANDRES H. NIELSEN, *Primary Examiner.*

U.S. Cl. X.R.

29—110, 125, 129.5, 132, 148.4; 198—192

UNITED STATES PATENT OFFICE
CERTIFICATE OF CORRECTION

Patent No. 3,416,638                 December 17, 1968

Richard D. Buck

It is certified that error appears in the above identified patent and that said Letters Patent are hereby corrected as shown below:

Column 6, line 38, after "portion" insert -- extending --.

Signed and sealed this 17th day of March 1970.

(SEAL)
Attest:

Edward M. Fletcher, Jr.               WILLIAM E. SCHUYLER, JR.

Attesting Officer                     Commissioner of Patents